United States Patent Office 3,383,212
Patented May 14, 1968

3,383,212

PHOTOGRAPHIC PROCESS UTILIZING COMPOSITION COMPRISING AN OXIDATIVELY ACTIVATABLE COLOR GENERATOR, THERMALLY ACTIVATABLE OXIDANT AND A REDOX COUPLE

Alexander MacLachlan, Wilmington, Del., assignor to E. I. du Pont de Nemours and Company, Wilmington, Del., a corporation of Delaware No Drawing. Filed Apr. 29, 1964, Ser. No. 363,592
16 Claims. (Cl. 96—48)

ABSTRACT OF THE DISCLOSURE

Process for forming a visible image from a composition comprising (1) an oxidatively activatable organic color-generator, such as a leuco dye, (2) a thermally activatable oxidant, and (3) a redox couple consisting of (a) a reductant which undergoes a photoinitiated redox reaction and (b) an oxidant which when photoactivated reacts with the reductant. The process is carried out by either irradiating the composition at wavelengths between 2000 A. and 5500 A. in a graphic pattern, followed by heating from 90° C. to 150° C.; or by heating in a graphic pattern followed by irradiating. In both procedures, heating causes activation of the thermally activated oxidant (2) which then reacts with color-generator (1) to form a color; and irradiation causes activation of oxidant (3b) which reacts with reductant (3a) to form a reducing agent which then reacts with oxidant (2) to permanently deactivate it. If the heating step occurs first, a positive stencil image is obtained, but if the irradiation occurs first, a negative sencil image is obtained.

This invention is directed to a novel printing process for forming a visible image against a stable background from a composition comprising (1) an oxidatively activatable organic color-generator, (2) a thermally activatable oxidant and (3) a redox couple which consists of (a) a reductant component capable of undergoing a photoinitiated redox reaction with the oxidant component and (b) an oxidant component which, when photoactivated, undergoes with the reductant component a photochemical redox reaction which produces a reducing agent.

The two steps of the herein described and claimed process consist of heating a substrate bearing the defined composition to a conversion temperature of from 90° C. to 150° C. and irradiating it with light of a wavelength between 2000 A. and 5500 A. Whichever operation, heating or irradiating, is done first is performed in a graphic pattern so as to produce an image corresponding to the pattern. Heating to the conversion temperature causes color formation as a result of a chemical reaction between the thermally activated oxidant and the color-generator. The irradiation with light of wavelength between 2000 A. and 5500 A. causes the redox couple to produce a reducing agent which prevents subsequent color formation at the conversion temperature. When the graphic pattern is obtained from a stencil and the heating step is performed before the irradiation step, a positive image of the stenciled pattern is obtained. If the irradiation step is performed before the heating step, a negative image of the stenciled pattern is obtained.

Image-forming compositions and processes play an essential part in photography, thermography, and related arts dealing with mechanisms of writing, printing, and producing images with the aid of light, heat, electricity, or combinations of these activating influences. Currently available methods of image production impose numerous limitations which are costly, inconvenient, time consuming, and sometimes potentially hazardous. Classical photography, for example, although efficient in the utilization of light energy, employs expensive chemicals and papers, involves multi-step processing and drying, and requires a highly skilled operator for consistently good results. Mechanical printing, while inexpensive and rapid for repetitive printing, is decidedly more expensive and slow for sequential printing. In either the repetitive or sequential type of mechanical printing, a wet image is produced. Other photochemical image-forming systems involve the use of toxic chemicals such as ammonia, cyanide derivatives, or caustic materials. A new printing system which would overcome the limitations of the present methods would advance the art and be desirable.

Dry photochemical processes are known but they have certain disadvantages. For example, the dry photochemical process of U.S. Patent 3,079,258 suffers from the fact that the photosensitive composition remains sensitive to light. Photosensitive papers prepared according to the method of this patent cannot be handled in daylight. Similarly, the process of U.S. Patent 3,042,515 produces a dry photographic film. Depending upon the particular halocarbon used, the photographic film may remain photosensitive and cannot be used in ordinary daylight. In certain cases the photographic film may be deactivated by heat but such treatment serves merely to volatilize a toxic halogenated compound such as carbon tetrabromide and thereby produces a health hazard.

An attempt to solve the problem of deactivation is described in U.S. Patent 3,082,086. This process depends upon the heat-promoted reaction between an organic amine which is serving as a color-generator and an anhydride to render the amine inert. Anhydrides, however, are subject to hydrolysis with atmospheric moisture, and the resultant films do not have the desired storage stability. Also the time of heating to cause deactivation is unduly long. In some cases the amides which result from reaction between the amine and the anhydride are subject to further oxidation to colored material as disclosed in British Patent 917,919. In any event, this process does not work with tertiary amines. A deactivating method for printing or imaging systems which would improve upon present methods would advance the art and be desirable.

It is, therefore, an object of this invention to provide a new and novel process for the production of visible images on a light and heat stable background by the two successive steps of heating to a conversion temperature of 90° C. to 150° C. and irradiating with light of wavelength 2000 A. to 5500 A. Another object is to provide novel light- and heat-sensitive compositions suiatble for printing by the said two steps. A still further object is to provide a process which produces either positive or negative copies depending upon the order in which the two steps are performed.

These objects are accomplished by the present invention defined below, described more fully in the discussion, and illustrated in the representative examples which follow.

This invention makes available a unique process for forming an image by a dry, rapid, readily controlled procedure. Some of the advantages of this new image-forming process over presently available image-forming systems are as follows.

Unlike photography, the process provided by this invention is simple and at the same time rapid, and it may be conducted in but one apparatus or machine. It is dry and therefore does not require a wet processing treatment or complicated gadgetry to give the appearance of a dry system. It can produce positives or negatives as desired.

Unlike xerography, it produces images in a variety of tones and requires no intricate image developing apparatus.

Unlike the processes of U.S. Patents 2,927,025 and 3,079,258 which form images by a dry photochemical process, the process of the present invention produces stable images which are not destroyed by further activation.

Unlike the diazo process, it is a dry process that does not require an objectionable material like ammonia, and can produce either positives or negatives.

Unlike the process of U.S. Patent 3,042,515, it neither produces an image-bearing film which is still photosensitive nor volatilizes a toxic halocarbon.

More specifically, the present invention is directed to a novel printing process for making a visible image from a light- and heat-sensitive composition comprising (1) an essentially colorless, oxidizable, nitrogen-containing organic color-generator which, when contained in said composition, is stable to oxidation by atmospheric oxygen under normal room and storage conditions but which is capable of oxidation to an intensely colored species, (2) a thermally activated oxidant that when mixed with said oxidizable color-generator and heated to a conversion temperature between about 90° C. and about 150° C. will, without further activation, oxidize said color-generator to said intensely colored species and (3) a redox couple which consists of (a) an organic reductant component which is capable of undergoing a photoinitiated redox reaction with the oxidant component and (b) said oxidant component which, when activated by radiation of a wavelength between 2000 A. and 5500 A., undergoes with the reductant component a photoinitiated redox reaction, said photoinitiated redox reaction between the different components of the couple forming a reducing agent which prevents thermo-oxidative color by heating to the conversion temperature, said process consisting of the steps of heating to a conversion temperature between about 90° C. and 150° C. and irradiating with light of wavelength 2000 A. to 5500 A., said printing process being further characterized in that the step which is performed first is effected in a graphic pattern.

Preferred embodiments include the heretofore defined process wherein (a) the heating step is applied by a thermographic process followed by the irradiation step; (b) wherein the light- and heat-sensitive composition contains as a thermally activated oxidant an organic peroxide; (c) wherein the light- and heat-sensitive composition contains as the oxidant component of the redox couple a quinone; (d) wherein the light- and heat-sensitive composition contains as the organic color-generator an aminotriarylmethane containing at least two p-dialkylamino-substituted phenyl groups having as a substituent ortho to the methane carbon atom an alkyl, alkoxy or halogen; and (e) wherein the light- and heat-sensitive composition is contained in a plastic film.

Many types of organic compounds function as organic color-generators in the process of this invention. All are characterized as being essentially colorless, containing nitrogen, being stable to air oxidation under normal storage conditions in the heat- and light-sensitive composition and being capable of producing a color in an oxidative process in the presence of a thermally activatable oxidant. The process may be a simple oxidation of the colorless compound to a colored species. The oxidation may initially produce a reactive intermediate which then undergoes a further reaction with a second component of the color-generator to produce the final colored species. Mixtures of color-generators may be used. These color generation processes, and the compounds which are adapted for them, are discussed in detail below.

Four different types of color generators are distinguished.

(A) LEUCO FORM OF DYES

One type of color-generator which may form part of the heat- and light-sensitive composition is the reduced form of the dye having, in most cases, one or two hydrogen atoms the removal of which together with one or two electrons produces a dye. Since the leuco form of the dye is essentially colorless, or in some instances it may be of a different color or of a less intense shade than the parent dye, it provides a means of producing an image when the leuco form is oxidized to the dye. This oxidation is accomplished by heating to a conversion temperature between about 90° C. and 150° C. an intimate admixture of the organic color-generator and a thermally activated oxidant as discussed below. Heating to the conversion temperature initiates a redox reaction between the organic color-generator and the thermally activated oxidant. The result is the removal of one or two readily removable hydrogen atoms, depending on the structure of the leuco form of the particular dye chosen, with the production of an intensely colored species. Representative dyes in the leuco form which are operative according to the invention include:

(a) Aminotriarylmethanes, such as—
- bis(p-benzylethylaminophenyl)(o-chlorophenyl)-methane,
- bis(p-dimethylaminophenyl)(4-dimethylamino-1-naphthyl)methane,
- bis(p-dimethylaminophenyl)(1,3,3-trimethyl-2-indolinylidenemethyl)methane and
- bis(p-dipropylaminophenyl)(o-fluorophenyl) methane.

Because of their superior resistance to color development due to air oxidation, the preferred species of aminotriarylmethanes have either an alkyl group, an alkoxy group or a halogen in the position ortho to the methane carbon in at least two of the aryl groups. Specific examples of the preferred species include:

- bis(4-dimethylamino-o-tolyl)(o-chlorophenyl) methane,
- bis(4-diethylamino-2-methoxyphenyl)(p-nitrophenyl)methane,
- tris(4-dimethylamino-2-chlorophenyl)methane,
- bis(4-dimethylamino-o-tolyl)(o-bromophenyl) methane,
- bis(4-diethylamino-o-tolyl)(p-benzylthiophenyl) methane and
- bis(4-diethylamino-o-tolyl)-2-thienylmethane.

(b) Aminoxanthenes, such as—
- 3-amino-6-dimethylamino-2-methyl-9-(o-chlorophenyl)xanthene
- 3,6-bis(dimethylamino)-9-(o-methoxycarbonylphenyl)xanthene (c) Aminothioxanthenes, such as—
- 3,6-bis(dimethylamino)-9-(o-methoxycarbonylphenyl)thioxanthene
- 3,6-dianilino-9-(o-ethoxycarbonylphenyl) thioxanthene (d) Amino-9,10-dihydroacridines, such as—
- 3,6-bis(benzylamino)-9,10-dihydro-9-methylacridine
- 3,6-diamino-9-hexyl-9,10-dihydroacridine (e) Aminophenoxazines, such as—

5-benzylamino-9-diethylamino-benzo[a]phenoxazine
3,7-bis(diethylamino)phenoxazine (f) Aminophenothiazines, such as—
3,7-bis(dimethylamino)-4-nitrophenothiazine
3,7-bis[N-ethyl-N-(m-sulfobenzyl)amino] phenothiazine, monosodium salt
3,7-diaminophenothiazine (g) Aminodihydrophenazines, such as—
3,7-bis(benzylethylamino)-5,10-dihydro-5-phenylphenazine
3,7-bis(dimethylamino)-5-(p-chlorophenyl)-5,10-dihydrophenazine
3,7-diamino-5,10-dihydro-5-methylphenazine
3,7-diamino-5,10-dihydro-2,5,8-trimethylphenazine (h) Aminodiphenylmethanes, such as—
1,4-bis[bis-(p-diethylaminophenyl)methyl]piperazine
bis(p-diethylaminophenyl)-1-benzotriazolylmethane
bis(p-diethylaminophenyl)(2,4-dichloroanilino) methane
bis(p-diethylaminophenyl)(octadecylamino) methane
1,1-bis(p-dimethylaminophenyl)ethane (i) Aminohydrocinnamic acids (cyanoethanes), such as—
α-cyano-4-dimethylaminohydrocinnamamide
α,β-dicyano-4-dimethylaminohydrocinnamamide
α,β-dicyano-4-(p-chloroanilino)hydrocinnamic acid, methyl ester
p-(2,2-dicyanoethyl)-N,N-dimethylaniline
p-(1,2,2-tricyanoethyl)-N,N-dimethylaniline (j) Leucoindigoid dyes, such as—
7,7′-diamino-5,5′-dichloroleucothioindigo
6,6′-dichloro-4-methylleucothioindigo
7,7′-dimethylleucoindigo
5,5′-disulfoleucoindigo, disodium salt
5,5′,7,7′-tetrachloroleucoindigo (k) 1,4-diamino-2,3-dihydroanthraquinones, such as—
1,4-bis(ethylamino)-2,3-dihydroanthraquinone
1-amino-4-methoxyanilino-2,3-dihydroanthraquinone
1,4-diamino-2,3-dihydroanthraquinone
1-p-(2-hydroxyethylamino)anilino-4-methylamino-2,3-dihydroanthraquinone It is not essential that the organic color-generator have a hydrogen which is removed by oxidation to form the colored species. One class of oxidizable compounds which do not contain removable hydrogens consists of acyl derivatives of leuco dyes which contain a basic NH group. Suitable compounds which have a basic NH group and which form amides when acylated include dihydrophenazines, phenothiazines, and phenoxazines. Specific examples of such compounds are 10-acetyl-3,7-bis(dimethylamino) phenothiazine, 10-(p-chlorobenzoyl) - 3,7 - bis(diethylamino)phenothiazine, 5,10 - dihydro-10-(p-nitrobenzoyl)-5-phenyl-3,7-bis(phenylethylamino)phenazine, and 10-(p-chlorobenzoyl)-3,7 - bis(naphthylmethylamino)phenoxazine.

Also there are certain compounds related to the triarylmethane leuco dyes which contain no hydrogen atoms that are removed during the oxidative color formation, but which, nevertheless, are thermally oxidized to a colored compound. Examples of such compounds are tris(p-dimethylaminophenyl)benzylthiomethane, 1-tris(p-diethylaminophenyl)methyl - 2 - phenylhydrazine, tris(4-diethylamino - o - tolyl)ethoxycarbonylmethane, bis(4-dipropylamino-o-tolyl)(o - fluorophenyl)butoxycarbonylmethane and bis[tris(4-diethylamino-o-tolyl)methyl]disulfide.

(B) ORGANIC AMINES

These are amines that can be oxidized to a colored species but do not fall into the groups of leuco dyes discussed above. Organic amines of this type are disclosed in U.S. Patents 3,042,515 and 3,042,517. Representative examples of this type of amine are 4,4′-ethylenedianiline, diphenylamine, N,N-dimethylaniline, 4,4′-methylenedianiline, triphenylamine and N-vinylcarbazole.

(C) 2-BENZOTHIAZOLINONE HYDRAZONES AND RELATED COMPOUNDS

Certain hydrazones and acyl derivatives of these hydrazones can be oxidized to diazonium compounds which will then couple with any of a large number of coupling agents to produce an azo dye. Compounds which are suitable for oxidation to the diazo component of the color-generator are disclosed in U.S.P. 3,076,721. Representative examples are:

3-methyl-2-benzothiazolinone hydrazone
6-chloro-3-methyl-2-benzothiazolinone hydrazone
6-methoxy-3-methyl-2-benzothiazolinone hydrazone The acylated hydrazones are more difficult to oxidize than the corresponding non-acylated hydrazones. As a result, they have greater storage stability. Representative acylated hydrazones which are suitable for oxidation to the diazo component of the color-generator are:

3-methyl-2-benzothiazolinone acetylhydrazone
3-methyl-2-benzothiazolinone p-toylsulfonylhydrazone
3-methyl-2-benzoselenazolinone propionylhydrazone
3-ethyl-2-benzoxazolinone phenylsulfonylhydrazone
5-methoxy-1,3-dimethyl-2-benzimidazolinone benzoylhydrazone
1-methylcarbostyril phenoxyacetylhydrazone Compounds which may be used as the coupling component of the color-generator include N,N-diethylaniline
N,N-dimethyl-m-toluidine
N-(2-cyanoethyl)-N-methyl-2-naphthylamine In place of a separate hydrazone and coupling agent as already described it is possible to use a composite hydrazone-coupler compound. The composite compounds supply both the diazo component and the coupler component, and thus provide the entire color-generator in one compound. Specific examples of such composite compounds are 3-methyl-2-benzothiazolinone 1 - hydroxy-2-naphthoylhydrazone and 3-methyl-2-benzothiazolinone 5-oxo-1-phenyl-3-pyrazolylcarbonylhydrazone.

In addition to the aforementioned amines, other types of coupler can be used provided certain selection rules are followed. Specific examples of other couplers are active methylene compounds, such as acetoacetamide and 2-thenoylacetonitrile, and phenolic compounds such as m-cresol, 1-naphthol, 6-sulfamido-2-naphthol and even hydroquinone. It is essential that the coupling component be selected so that the hydrazone is thermally oxidized in preference to the coupling component. If the coupling component is a weak reducing agent not only can most hydrazones be used but even difficulty oxidized compounds such as acylated hydrazones can be used. When the acylated hydrazones are employed the thermal oxidant should be a strong oxidizing agent. If the coupling component is a moderately strong reducing agent then the acylated hydrazones usually cannot be employed. If the coupling component is also a potent reducing agent, such as hydroquinone, it is necessary to select a hydrazone which is readily oxidized.

It is also essential to exercise care in selecting the hydrazone and reducing agent produced by irradiation of the redox couple (see discussion below). These components must be chosen so that the photochemically produced reducing agent is oxidized by the thermal oxidant in preference to the hydrazone. With difficultly oxidized compounds such as the acylated hydrazones there usually is no problem. If the hydrazone is not acylated it usually is necessary that the redox couple produce a strong reducing agent.

(D) AROMATIC DIAMINES WITH COUPLING AGENT

An aromatic diamine in combination with a coupling agent undergoes an oxidative condensation reaction which leads to azomethine and indoaniline dyes. More particularly, the reactants in this condensation are N,N-dialkylphenylenediamines and couplers such as active methylene compounds, anilines and phenolic compounds. The chemistry of these oxidative coupling reactions is reviewed by Vittus et al. in J. Phot. Sci., 2, 81 (1954) and ibid. 6, 157 (1958). It has been found that these oxidative condensation reactions are adaptable to the subject processes. Examples of N,N-dialkylphenylenediamines which are operative in the present process are N,N-dimethyl-p-phenylenediamine and N,N-dimethyltoluene-2,5-diamine. Suitable couplers include 2-acetyl-4'-chloroacetanilide, 2-benzoyl-2'-methoxyacetanilide, o-ethylphenol, 2-naphthol, 7-acetylamino-1-naphthol, N,N-dimethylaniline and N,N-diethyl-m-toluidine.

Many color-generators perform best when an acid is present. Color-generators which contain amino groups can bind the acid by salt formation. The amount of acid is usually from 0.33 mole to 1 mole per mole of amino nitrogen. Representative acids are hydrochloric, hydrobromic, sulfuric, phosphoric, acetic, oxalic and p-toluenesulfonic. Also useful are acids in the "Lewis" sense such as zinc cloride, zinc bromide and stannic chloride.

Many types of organic compounds function as thermally activated oxidants in the invention process. Most of these thermally activated oxidants are known to undergo a thermally initiated homolytic dissociation into free radicals. These free radicals are the active oxidizing species which combine with the color-generator to produce the highly colored species. Regardless of the mechanism, the essential feature of the thermally activated oxidant is that when admixed with the color-generator and heated to the conversion temperature a colored species is formed. Examples of different classes of suitable thermally activated oxidants are:

(A) Diacyl peroxides—
- benzoyl peroxide
- acetyl peroxide
- p-chlorobenzoyl peroxide
- succinyl peroxide
- naphthoyl peroxide (B) Dialkyl peroxides—
- tert-butyl peroxide
- cumyl peroxide
- tert-amyl peroxide (C) Hydroperoxides—
- cumene hydroperoxide
- tert-amyl hydroperoxide
- tert-butyl hydroperoxide
- pinane hydroperoxide (D) Azo compounds—
- 2,2'-azobis(2-methylpropionitrile)
- azodicyclohexylcarbonitrile
- dimethyl 2,2'-azobis(2-methylpropionate)
- phenylazodiphenylmethane
- azobis(diphenylmethane)

(E) N-chlorosubstituted compounds—
- N-chloro-N-ethyl-m-nitrobenzenesulfonamide
- N,N',4,4'-tetrachlorooxanilide
- N,N'-dichloro-N,N'-dimethylbiphenylenesulfone-4,4'-disulfonamide
- N,N'-dichloro-N,N'-bis(m-nitrobenzenesulfonyl) ethylenediamine (F) Biimidazoles—
- 2,2',4,4',5,5'-hexaphenylbiimidazole
- 2,2'-bis(p-methoxyphenyl)-4,4',5,5'-tetraphenylbiimidazole
- 2,2'-bis(p-benzylthiophenyl)-4,4',5,5'-tetraphenylbiimidazole
- 2,2'-bis(3,4-dimethoxyphenyl)-4,4',5,5'-tetraphenyl-biimidazole
- 2,2',4,4',5,5'-hexakis(p-methoxyphenyl)biimidazole Because of their lower activation temperatures, the preferred hexaarylbiimidazoles from the above list are 2,2',4,4',5,5'-hexaarylbiimidazoles which undergo homolytic dissociation to give two 2,4,5-triarylimidazolyl free radicals each of which is represented by the formula

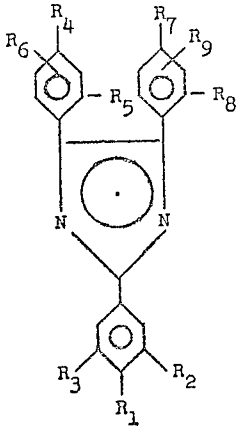

said radical having as an essential part of its structure one and only one unapired electron, said electron being delocalized throughout the conjugated triarylimidazolyl system wherein $R_1$ to $R_9$ are selected from the group consisting of hydrogen and a substituent free from a hydrogen atom capable of reacting with methyl magnesium iodide, at least one of the substituents $R_1$, $R_4$, $R_5$, $R_7$ and $R_8$ having a negative para sigma value, and the substituent in the positions $R_6$ and $R_9$ occupying one of the positions 3 and 5 of their respective phenyl ring.

The term "sigma constant" is discussed and defined by H. H. Jaffe in Chem. Rev. 53, 191 (1953) particularly at pages 219–233 and in Table 7.

The redox couple must fulfill three requirements. First, it must not function as a reducing agent with respect to the thermally activated oxidant, otherwise it would interfere with the color forming reaction. Second, the couple must undergo a reaction initiated by light of a wavelength between 2000 A. and 5500 A. to produce a reducing agent. Third, this photochemically produced reducing agent must deactivate the heat-sensitive system by preventing further color formation. The deactivation will be achieved if the photochemically produced reducing agent is a stronger reducing agent than the color-generator.

(A) OXIDANT COMPONENT OF REDOX COUPLE

A variety of compounds will serve as the oxidant component of the redox couple. It usually is an organic compound but can be an inorganic one. Quinones are the preferred class of oxidant components. Representative quinones are:

(a) Quinones—
- 1,2-naphthoquinone
- 2,5-diethoxy-p-benzoquinone
- 3-acetylphenanthrenequinone
- 1,6-pyrenequinone
- 1,8-pyrenequinone
- 4-nitro-9,10-phenanthrenequinone
- 2-methylanthraquinone (b) Ketones—
- 1H-benzonaphthen-1-one
- 6-acetyl-1H-benzonaphthalene-1,3(2H)-dione
- anthrone
- 6-benzoyl-8-chloro-1H-benzonaphthene-1,2(H)-dione Other organic oxidant components contain nitrogen, frequently in a corbon-nitrogen double bond structure.

Specific examples of different classes of nitrogen-containing oxidant compounds are:

(c) Phenazines—
phenazine
1,4-dimethoxyphenazine
2,3-dimethoxyphenazine
1,4-dibenzylphenazine
(d) Acridines—
9-phenylacridine
9-(2,4-dichlorophenyl)acridine
2-methyl-9-phenylacridine
2-ethoxy-9-phenylacridine
(e) Phenoxazinones—
2-amino-3H-phenoxazin-3-one
2-amino-7-methyl-3H-phenoxazin-3-one
2-amino-7-phenyl-3H-phenoxazin-3-one
2-dimethylamino-3H-phenoxazin-3-one
(f) Quinolines—
quinoline
4-benzylquinoline
4-methylquinoline
8-phenylquinoline
(g) Phenanthrolines—
1,10-phenanthroline
3,4-dimethyl-1,10-phenanthroline
3,4,8-trimethyl-1,10-phenanthroline
3,4,7,8-tetramethyl-1,10-phenanthroline
(h) Isoquinolines—
isoquinoline
3-ethylisoquinoline
3-methylisoquinoline
6-methylisoquinoline
(i) Anils—
10-phenylimino-9-anthrone
10-p-tolylimino-9-anthrone The above organic oxidant components of the redox couple are characterized by having a reducible carbon-oxygen or carbon-nitrogen double bond.

In addition to the above organic compounds, polyvalent metal compounds will function as satisfactory oxidant components for the redox couple. Ferric compounds are an example of such polyvalent metal compounds. When a photoreducible ferric compound is irradiated with light of a wavelength between 2000 A. and 5500 A., it is reduced to a ferrous compound by the reductant component of the couple. The ferrous compound then prevents further color formation by the thermally activated oxidant and color-generator. Specific examples of operable ferric compounds are ferric chloride, ferric acetate and ferric ammonium citrate.

(B) REDUCTANT COMPONENT OF REDOX COUPLE

The reductant component of the redox couple reacts with the oxidant component of the couple. In this process the reductant component becomes oxidized, usually by loss of a hydrogen atom. Hydrogen-containing organic compounds which are effective chain-transfer agents in polymerization reactions are usually effective reductant components of the redox couple. Sometimes it is not even necessary to add a separate compound for the reductant component because small amounts of retained solvent or some component of the substrate or the substrate itself will function as the reductant component.

Examples of classes of compounds which will function as the reductant component of the redox couple are:

(a) Ethers—
diethyl ether
dioxane
polyethylene glycol of M.W. 600
polypropylene glycol of M.W. 1000
polytetramethyleneether glycol of M.W. 1000
(b) Esters—
methoxyethyl terephthalate cyclohexyl adipate
1,3-cyclohexylene diacetate
(c) Alcohols—
isobutanol
isooctanol
cyclohexanol
1,2,3,4-tetrahydro-1,4-naphthalenediol
furfuryl alcohol
diethanolamine
triethanolamine
(d) Compounds containing allylic or benzylic hydrogen—
cumene
1,4-dihydronaphthalene
p-cymene
tetralin
(e) Acetals—
benzaldehyde dioctylacetal
terephthalaldehyde cyclic bis(ethyleneacetal)
terephthalaldehyde bis(dioctylacetal)
(f) Aldehydes—
benzaldehyde
m-chlorobenzaldehyde
terephthalaldehyde
(g) Amides—
adipamide
N,N-diethylformamide
2-imidazolidinone
2-oxohexamethylenimine
succinamide
(h) Miscellaneous—
triphenyl tin hydride
dioctylphosphite
triphenylsilane Certain phenolic compounds frequently used as antioxidants will also function as the reductant component of the redox couple. An example is 2,6-di-t-butyl-p-cresol. A small amount of this compound is sometimes added as an antioxidant to many different materials of commerce, such as, for example, some brands of polyethylene glycol. These polyethylene glycols owe some, but not all, of their activity as reductant components of the redox couple to their content of small amounts of 2,6-di-t-butyl-p-cresol. The concentration of this type of phenol must be carefully controlled because it has a tendency to decrease the efficiency of the color-forming reaction.

When the oxidant component is a low molecular weight compound, volatility is sometimes a problem. If paper is the substrate, it may even be necessary to use sufficient reductant component to keep the paper saturated. Since this problem is largely eliminated with less volatile materials, the preferred reductant components are of substantial molecular weight. These higher molecular weight materials may also serve useful functions as component solvents and as film plasticizers.

In special cases the oxidant and reductant portions of the redox couple can be combined in the same molecule, i.e., one molecule undergoes an internal oxidation-reduction reaction. The requirements for this single compound are the same as for the individual components. It must initially be inactive as a reducing agent and must undergo a redox reaction initiated by light of wavelength between 2000 A. and 5500 A. to produce a reducing agent. An example of this type of compound is 1,4-bis(2-methoxyethyl)anthraquinone.

A general procedure for evaluating both oxidant and reductant components of the redox couple is given in the examples.

In order to print on a composition comprising a color-generator, a thermally activated oxidant and a photoactivated redox couple which produces a reducing agent, it is necessary to apply two different activating means, namely heat and light. Activation by means of heat produces an intense color. Activation by means of light produces a reducing agent which prevents any subsequent color formation due to heat activation. If the activation means first employed is in a graphic pattern, this process will print a graphic pattern. Therefore, the present novel printing process consists of sequential application of the activation means consisting of heating to a conversion temperature of 90° C. to 150° C. and irradiating with light or wavelength 2000 A. to 5500 A., the activation means which is employed first being applied in a graphic pattern.

A novel feature of the invention process is that it can produce either a positive or a negative copy depending on the order in which the two activating means are applied. Thus, if the graphic pattern is obtained by a stencil, there will be obtained a positive copy of the stencil if the heating step is performed first and a negative copy of the stencil will be obtained if the irradiation step is performed first.

When the first activation means is graphically applied by heating to a conversion temperature of 90° C. to 150° C., a visible image is directly produced. This image is not stable in that further exposure to heat develops color in the background areas. Deactivation is achieved by irradiation with light of from 2000 A. to 5500 A. and a stable image is obtained. This deactivation may be achieved in an apparatus which supplies an intense amount of radiation for a brief period. If the components of the redox couple are chosen so that the deactivating radiation is of a wavelength which is present in the ambient light, the deactivation may proceed during the course of normal usage. In this case, no separate deactivation step and apparatus are required.

When the first activation means is applied by graphically irradiating with light of a wavelength between 2000 A. and 5500 A. no visible change is produced. However, the irradiated areas have been deactivated so that a latent image is present. This latent image can be developed by heating to a conversion temperature between 90° C. and 150° C. The two steps of the printing process can be applied in rapid sequence as for instance in a single machine which conveys a substrate bearing the heat- and light-sensitive composition from an irradiation station directly to a heating station. Alternatively, there may be a considerable time interval between the application of the two activation means.

By means of the test for operability described below it has been found that the wavelength of light which activates the redox couple is usually between 2000 A. and about 5500 A. In some cases the activating radiation may be extended to longer wavelengths by adding certain dyes to the photosensitive composition. Such dyes function as sensitizers as is well known in the art. See, for instance, C. E. Kenneth Mees, The Theory of the Photographic Process, The Macmillan Company, 1952, pages 317–493. In general, the activating light is absorbed by the oxidant component of the redox couple. Thus, the light absorption characteristics of the oxidant component of the redox couple determine the wavelength of the activating radiation. This light need not be monochromatic. In fact, bands several hundred angstrom units in width are frequently desirable. Since there usually is no deleterious effect from radiation of a wavelength which does not activate the redox couple, most light sources do not need to be filtered. However, various filters may be desirable in certain cases. An example is when the thermally activated oxidant is a biimidazole. Since the biimidazoles are also photooxidants with respect to ultraviolet light, it is necessary to filter any light source which emits ultraviolet light.

Suitable means for providing radiation include sunlamps, electronic flash guns, germicidal lamps, and ultraviolet lamps providing specifically light of long wavelength (3663 A.), ultraviolet lamps providing light of short wavelength (2537 A.), incandescent lamps and sunlight.

If the light activation step is performed first, the light must be applied in a graphic pattern. This may be achieved by the use of stencils in conjunction with a suitable light source. Templates can be made from any differentially radiation-absorptive graphic materials. Examples are photographic slides and typewritten material on ultraviolet transmissive paper. The light may also be applied graphically by reflection techniques.

By means of the test for operability described below it has been found that conversion temperatures of between 90° C. and 150° C. are satisfactory.

The step of heating to the conversion temperature may be performed in several different manners. The substrate bearing the photosensitive composition can be passed around a heated bar or between squeeze rolls of which one or both is maintained at the required elevated temperature. Ovens are convenient for providing heat especially when large objects are to be heated. Infrared lamps are also suitable. If the heating treatment is applied first, care must be exercised that the wavelengths produced by the infrared lamp do not also activate the redox couple. If the output of the lamp is not satisfactory, suitable filters can be used to remove the undesirable wavelengths of light.

If the heat activation step is performed first, the heat must be applied in a graphic pattern. This may be achieved by the use of stencils in conjunction with an infrared lamp particularly when the pattern is large. Thermographic methods of reproduction also provide a satisfactory method of applying the heat activation in a graphic pattern. Thermographic methods are well known. Representative methods and apparatus for thermographic application of heat are described in U.S. Patents 2,740,895 and 3,089,952.

It is frequently desirable to evaluate by actual test the various components of the heat- and light-sensitive composition and to determine the stoichiometry of the reactions involved. It is also desirable to evaluate the process variables, namely, the wavelength of light which activates the redox couple and the time and temperature required to activate the thermally activated oxidant. A suitable test is as follows: A composition consisting of thermally activated oxidant, color-generator and redox couple is either applied to a suitable substrate, such as paper, or is mixed with a solution of a suitable polymer and cast into a film. Half of the film or impregnated paper is irradiated with light of the particular wavelength which is to be evaluated. The entire piece of impregnated paper or film is now heated to a conversion temperature for a period of time. If the two halves are of different intensities, deactivation by the light has occurred. Larger differences of color between the two halves correspond to greater efficiencies of photodeactivation. No color in the irradiated portion indicates complete photodeactivation. By means of this simple test it is possible to evaluate different conversion temperatures, the period of time required at a conversion temperature, the type of light source and the type of filter, if any, that is used with the light source, the compatibility of the various components of the heat- and light-sensitive composition and the ratios of these various reactants.

The amount of color-generator determines the depth of color which will be obtained with a given heat- and light-sensitive composition. The thermally activated oxidant is, therefore, measured in proportion to the color-generator. Many color-generators, such as the leuco triarylmethane dyes, will require a molar equivalent of oxidant for complete conversion to the colored form. Less than molar equivalents of oxidants are operable but wasteful of color-generator. Thus, ratios of thermally activated oxidant to color-generator from about 1:10 to about 100:1 are operable. The preferred range is from 1:1 to 2:1.

The reductant component of the redox couple is frequently employed in large excess over the oxidant component of the redox couple. This practice is particularly followed when it is desired that the reductant component also function as a component solvent or as a film plasticizer. Only in those few cases where the reductant component is quite active, such as 2,6-di-t-butyl-p-cresol, is it necessary to restrict the amount of the reductant component. When a composition is deactivated by exposure to ambient light for an extended period of time, the oxidant component probably goes through several redox cycles. Thus, the limiting amount of the redox couple is usually determined by the oxidant rather than by the reductant component.

The oxidant component of the redox couple is measured in proportion to the thermally activated oxidant. Many, but not all, thermally activated oxidants require an equivalent molar amount of oxidant component of the redox couple. An insufficiency of oxidant component of the redox couple can produce incomplete deactivation while large excess may unduly lower the photographic speed of the composition. The optimum amount can best be determined by the test described above. The operable ratio of thermally activated oxidant to oxidant component of the redox couple is from 100:1 to 1:20 and the preferred ratio is from 5:1 to 1:2.

For many of the heat- and light-sensitive compositions, the color-generator, the thermally activated oxidant and the redox couple can be mixed in a suitable mutual solvent and applied to a substrate by impregnation. Alternatively, a film-forming polymer may also be dissolved in the mutual solvent and a heat- and light-sensitive film cast from the solution. Because the thermally activated oxidant is not active at room temperature, there is no color-forming reaction until the composition is heated. Eventually, however, the composition will become colored because the thermally activated oxidant has a small amount of reactivity even at room temperature. If long-term storage stability is required for a particular application, two additional techniques which increase the storage stability are available.

One such technique is used in thermography. The heat-sensitive copy-paper useful in thermographic reproduction methods is prepared from a heat-sensitive composition which is comprised of solid reactants which are potentially chemically capable of irreversibly and rapidly reacting to produce a visibly different reaction product, but which are normally physically prevented from so reacting. The structure is so designed that an increase in temperature allows the reaction to take place. The reaction is initiated by the melting, or softening, or other physical change, of one or more of the reactive substances. The techniques for preparing heat-sensitive compositions in which the reactants are maintained in physically distinct, chemically inter-reactive relationship are well known. Examples of patents which describe this technique are U.S. 2,663,654; 2,663,655; 2,663,656; 2,663,657; 3,076,721; and 3,094,417.

By the use of the techniques described in the above patents, the color-generator and thermally activated oxidant can be maintained in a physically distinct, chemically interreactive relationship and thereby prevent the color-formation reaction until the composition is heated to the conversion temperature. The heating step serves to mix the two components and to activate the oxidant.

Another technique for obtaining additional storage stability is by use of microencapsulation. This technique allows small particles of one or more of the reactants to be wrapped in a protective jacket. The jacket can be ruptured later by either heat or pressure. The technique of microencapsulation is well known and is described in U.S. 2,800,457; 2,800,458; and 3,015,128.

By the use of the microencapsulation techniques described in the above patents, the color-generator and thermally activated oxidant can be maintained in a physically separated condition and thereby prevent the color-forming reaction until heat or pressure ruptures the microcapsule containing one or more of the reactants. Thus, microencapsulation makes it possible to extend the storage stability of a particular heat- and light-sensitive composition. For instance, if a particular thermally activated oxidant is contained in pressure-rupturable microcapsules, the composition will not be heat- or light-sensitive and can be stored almost indefinitely. Prior to use, the composition can be rendered heat- and light-sensitive by pressure which is sufficient to rupture the microcapsules. Such pressure may conveniently be applied by rollers. The heat- and light-sensitive composition will now have short-term storage stability sufficient to allow completion of the subject printing process. Similarly, either the color-generator or thermally activated oxidant can be contained in a heat-rupturable microcapsule. In this case, the heating step of the printing process is sufficient to rupture the capsules as well as to activate the thermal oxidant.

The heat- and light-sensitive composition of the present invention may be utilized as a coating, impregnant or additive for various substrates. Frequently, the substrates will be materials used in the graphic arts and in decorative applications. The substrates may be rigid or flexible; solid or porous; either opaque or transparent to ultraviolet light. They may include paper ranging from tissue paper to heavy cardboard; films of plastics and polymeric materials such as regenerated cellulose, cellulose acetate, cellulose nitrate, polyethylene, poly(methyl methacrylate), polyvinyl chloride; textile fabrics; glass; wood and metals. Opaque as well as transparent substrates may be used. Substrates in which the heat- and light-sensitive composition is dissolved or which bear the composition as a coating on the side away from the light source must be transparent to that wavelength of radiation which is used to activate the redox couple.

The novel heat- and light-sensitive compositions herein described and claimed are useful in a variety of applications. Among these are:

(1) Printing applications.—Very soft paper, as for example tissue paper, can be easily imaged when it has been treated with the subject photosensitive composition, by projecting an image onto the treated surface using light of a wavelength between 2000 A. and 5500 A. The image paper can then be deactivated by heating to a conversion temperature between 90° C. and 150° C.

(2) Pattern lay-out for metal working.—The photosensitive composition may be applied to a metal surface when suitably formulated as a paint or a lacquer. The metal surface may then be marked by irradiation with light of a suitable wavelength through a template and the image so produced may be made permanent by heating to the conversion temperature. The image may correspond to holes which are to be drilled or other operations of metal working and manufacture. This technique is particularly valuable when the metal to be marked has an irregular shape.

(3) Copy-sheets.—Copy-sheets made from the heat- and light-sensitive composition can be imaged by the subject printing process. They may be imaged thermographically and then deactivated by irradiation with light of suitable wavelength. The copy-sheets may also be irradiated by light reflected from a printed message and the resultant latent image developed by heating to the conversion temperature. The images produced by the latter method have high resolution and are suitable for use in various microimaging applications such as storing of vital records.

Representative examples illustrating the present invention follow.

EXAMPLE 1

General evaluation procedure.—A solution is prepared by dissolving 890 mg. of tris(4-diethylamino-o-tolyl) methane trihydrochloride, 210 mg. of 9,10-phenanthrenequinone and 240 mg. of benzoyl peroxide in 100 ml. of a 1:1 by volume mixture of ethanol and polyethylene glycol having an average molecular weight of 600 ("Carbowax" 600 supplied by Union Carbide Corporation). Filter paper is impregnated with this solution and allowed to air-dry. One-half of the impregnated paper is covered with a mask and the exposed half is irradiated with two flashes from a low pressure xenon flash tube having an input of 200 watt-seconds, and a light output of 5000 candle power seconds distributed between the wavelengths of 3400 A. and 6500 A. (supplied by Hico Corp., Watertown, Mass., under the name of Hico-Lite Electronic Flash, Model K). The entire impregnated paper is heated for 10 seconds between the metal plates of a hydraulic press maintained at 125° C. The unirradiated portion of the paper is colored blue while the irradiated portion is only slightly colored.

Similar results are obtained when the benzoyl peroxide in the solution is replaced with an equivalent molar amount of the thermally activated oxidants shown in Table I, as follows:

Table I.—Thermally activated oxidants

| Example: | |
|---|---|
| 2 | 2,2'-azobis(2-methylpropionitrile). |
| 3 | N,N'-dichloro-N,N'-bis(m-nitrobenzenesulfonyl)-ethylenediamine. |
| 4 | Phenylazodiphenylmethane. |
| 5 | p-Chlorobenzoyl peroxide. |
| 6 | Cumyl peroxide. |
| 7 | 2,2'-bis(p-methoxyphenyl)-4,4',5,5'-tetra-phenylbiimidazole.[1] |

[1] Irradiated through a Corning 0–15 filter (supplied by Corning Glass Co.) which transmits light of wavelengths about 3900 A.

The 9,10-phenanthrenequinone of the solution in Example 1 is replaced by an equivalent molar amount of the oxidant component of the redox couple shown in Table II.

Table II.—Evaluation of different oxidant components of the redox couple

| Example: | Oxidant component of redox couple |
|---|---|
| 8 | Anthrone. |
| 9 | 9-(2,4-dichlorophenyl)acridine. |
| 10 | 6-acetyl-1H-benzonaphthene-1,3(2H)-dione. |
| 11 | 3-methylisoquinoline. |
| 12 | 1,10-phenanthroline. |
| 13 | Phenazine. |
| 14 | 1,4-dibenzylphenazine. |
| 15 | 1,4-dimethylphenazine. |
| 16 | 2-amino-3H-phenoxazin-3-one. |
| 17 | 1,6-pyrenequinone. |
| 18 | Quinoline. |

In each case satisfactory deactivation is obtained, i.e. little or no color develops in the irradiated areas upon subsequent heating under conditions that produce color prior to the irradiation.

The tris(4-diethylaminophenyl-o-tolyl)methane trihydrochloride in the solution of Example 1 is replaced by an equivalent molar amount of various color-generators and a molar equivalent of p-toluenesulfonic acid monohydrate is added. Paper is impregnated and tested for color formation and deactivation as already described. The color-generators employed and the colors obtained are shown in Table III. In each case the heat- and light-sensitive composition is effectively deactivated against further thermal color development by the light exposure.

Table III.—Evaluation of various color-generators

| Ex. | Color-Generator | Color Produced |
|---|---|---|
| 19 | Bis(4-diethylamino-o-tolyl)(p-benzylthiophenyl)-methane. | Gray. |
| 20 | Bis(4-diethylamino-o-tolyl)(3,4-methylenedioxy-phenyl)methane. | Green-gray. |
| 21 | 1,4-bis[bis(p-dimethylaminophenyl)methyl]-benzene. | Green-blue. |
| 22 | Tris(p-diemthylaminophenyl)methane | Violet. |
| 23 | α,β-Dicyano-4-methylaminohydrocinnamamide | Red-violet. |
| 24 | α,β-Dicyano-4-dimethylaminohydrocinnamic acid, methyl ester. | Scarlet. |
| 25 | 10-benzoyl-3,7-bis(dimethylamino)phenothiazine | Green-blue. |

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A printing process for making a visible image from a light- and heat-sensitive composition comprising (1) an essentially colorless, oxidizable, nitrogen-containing organic color-generator which, when contained in said composition, is stable to oxidation by atmospheric oxygen under normal room and storage conditions but which is capable of oxidation to an intensely colored species, (2) a thermally activated oxidant that when mixed with said oxidizable color-generator and heated to a conversion temperature between about 90° C. and about 150° C. will, without further activation, oxidize said color-generator to said intensely colored species and (3) a redox couple which consists of (a) an organic reductant component which is capable of undergoing a photoinitiated redox reaction with the oxidant component, said reductant not being a reductant for the thermally activated oxidant, and (b) said oxidant component which, when activated by radiation of a wavelength between 2000 A. and 5500 A., undergoes, with the reductant component, a photoinitiated redox reaction, said photoinitiated redox reaction between the different components of the couple forming a reducing agent which is a stronger reducing agent for said thermally activated oxidant than is said color-generator and thereby prevents thermo-oxidative color formation by heating to the conversion temperature, said process consisting of carrying out sequentially in any order, the steps of heating to a conversion temperature between about 90° C. and 150° C. and irradiating with light of wavelength 2000 A. to 5500 A.; said printing process being further characterized in that the step which is performed first is effected in a graphic pattern.

2. A process according to claim 1 wherein the heating step is applied by a thermographic process followed by said irradiation step.

3. A process according to claim 1 wherein said light- and heat-sensitive composition contains, as a thermally activated oxidant, an organic peroxide.

4. A process according to claim 1 wherein said light- and heat-sensitive composition contains a quinone as the oxidant component of the said redox couple.

5. A process according to claim 1 wherein said light- and heat-sensitive composition contains, as the organic color-generator, an aminotriarylmethane containing at least two p-dialkylamino-substituted phenyl groups having a substituent ortho to the methane carbon atom, said substituent being selected from the group consisting of an alkyl, an alkoxy and a halogen substituent.

6. A process according to claim 1 wherein said light- and heat-sensitive composition is contained in a plastic film.

7. The process of claim 1 wherein said light- and heat-sensitive composition is contained as a coating on paper.

8. The process of claim 1 in which, in the composition, component (1) is selected from the class consisting of a leuco dye having one to two removable hydrogens, the removal of which forms a differently colored compound; an N-acyl derivative of a leuco dye defined immediately above; a triarylmethane wherein the single remaining methane bond is substituted with benzylthio, 2-phenylhydrazino, alkoxycarbonyl or disulfide; an organic amine; a 2-benzothiazolinone hydrazone or N-acyl derivative thereof, oxidizable to a diazonium compound, in combination with a coupling component; and an N,N-dialkyl-phenylenediamine in combination with a coupling component;

component (2) is selected from the class consisting of diacylperoxides, dialkylperoxides, hydroperoxides, azo compounds, N-chloro compounds, and hexaarylbiimidazoles;

the oxidant component (b) of redox couple (3) is selected from the class consisting of a quinone, a ketone, a phenazine, an acridine, a phenoxazinone, a quinoline, a phenanthroline, an isoquinoline, an anil and a polyvalent metal compound; and the reductant component (a) of redox couple (3) is selected from the class consisting of ethers, esters, alcohols, allylic compounds, benzylic compounds, acetals, aldehydes, amides, triphenyl tin hydride, dioctylphosphite, triphenyl silane and phenols.

9. The process of claim 8 in which, in the composition, the reductant component (a) of redox couple (3) is selected from the class consisting of:

diethyl ether,
dioxane,
polyethylene glycol of M.W. 600,
polypropylene glycol of M.W. 1000,
polytetramethyleneether glycol of M.W. 1000,
methoxyethyl terephthalate,
cyclohexyl adipate,
1,3-cyclohexylene diacetate,
isobutanol,
isooctanol,
cyclohexanol,
1,2,3,4-tetrahydro-1,4-naphthalenediol,
furfuryl alcohol,
diethanolamine,
triethanolamine,
cumene,
1,4-dihydronaphthalene,
p-cymene,
tetralin,
benzaldehyde dioctylacetal,
terephthalaldehyde cyclic bis(ethyleneacetal),
terephthalaldehyde bis(dioctylacetal),
benzaldehyde,
m-chlorobenzaldehyde,
terephthalaldehyde,
adipamide,
N,N-diethylformamide,
2-imidazolidinone,
2-oxohexamethylenimine,
succinamide,
triphenyl tin hydride,
dioctylphosphite,
triphenylsilane, and
2,6-di-t-butyl-p-cresol.

10. The process of claim 9 in which, in the composition, oxidant component (b) of redox couple (3) is selected from the class consisting of:

1,2-naphthoquinone,
2,5-diethoxy-p-benzoquinone,
3-acetylphenanthrenequinone,
1,6-pyrenequinone,
1,8-pyrenequinone,
4-nitro-9,10-phenanthrenequinone,
2-methylanthraquinone,
1H-benzonaphthen-1-one,
6-acetyl-1H-benzonaphthene-1,3(2H)-dione,
anthrone,
6-benzoyl-8-chloro-1H-benzonaphthene-1,3(2H)-dione,
phenazine,
1,4-dimethylphenazine,
2,3-dimethoxyphenazine,
1,4-dibenzylphenazine,
9-phenylacridine,
9-(2,4-dichlorophenyl)acridine,
2-methyl-9-phenylacridine,
2-ethoxy-9-phenylacridine,
2-amino-3H-phenoxazin-3-one,
2-amino-7-methyl-3H-phenoxazin-3-one,
2-amino-7-phenyl-3H-phenoxazin-3-one,
2-dimethylamino-3H-phenoxazin-3-one,
quinoline,
4-benzylquinoline,
4-methylquinoline,
8-phenylquinoline,
1,10-phenanthroline,
3,4-dimethyl-1,10-phenanthroline,
3,4,8-trimethyl-1,10-phenanthroline,
3,4,7,8-tetramethyl-1,10-phenanthroline,
isoquinoline,
3-ethylisoquinoline,
3-methylisoquinoline,
6-methylisoquinoline,
10-phenylimino-9-anthrone,
10-p-tolylimino-9-anthrone,
ferric chloride,
ferric acetate, and
ferric ammonium citrate.

11. The process of claim 10 in which, in the composition, component (2) is selected from the class consisting of:

benzoyl peroxide,
acetyl peroxide,
p-chlorobenzoyl peroxide,
succinyl peroxide,
naphthoyl peroxide,
tert-butyl peroxide,
cumyl peroxide,
tert-amyl peroxide,
cumene hydroperoxide,
tert-amyl hydroperoxide,
tert-butyl hydroperoxide,
pinane hydroperoxide,
2,2′-azobis(2-methylpropionitrile),
azodicyclohexylcarbonitrile,
dimethyl-2,2′-azobis(2-methylpropionate),
phenylazodiphenylmethane,
azobis(diphenylmethane),
N-chloro-N-ethyl-m-nitrobenzenesulfonamide,
N,N′-4,4′-tetrachlorooxanilide,
N,N′-dichloro-N,N′-dimethylbiphenylenesulfone-4,4′-disulfonamide,
N,N′-dichloro-N,N′-bis(m-nitrobenzenesulfonyl) ethylenediamine, and
a 2,2′,4,4′,5,5′-hexaarylbiimidazole.

12. The process of claim 11 in which, in the composition, component (1) is selected from the class consisting of an aminotriarylmethane, an aminoxanthene, an aminothioxanthene, an amino-9,10-dihydroacridine, an aminophenoxazine, an aminophenothiazine, an aminodihydrophenazine, an aminodiphenylmethane, an aminohydrocinnamic acid, a leucoindigoid dye, a 1,4-diamino-2,3-dihydroanthraquinone, an acylated dihydrophenazine, an acylated phenothiazine, an acylated phenoxazine, tris(p-dimethylaminophenyl)benzylthiomethane, 1 - tris(p - diethylaminophenyl)methyl - 2 - phenylhydrazine, tris(4-diethylamino-o-tolyl)ethoxycarbonylmethane, bis(4 - dipropylamino - o - tolyl) (o-fluorophenylbutoxycarbonylmethane, and bis[tris(4 - diethylamino-o-tolyl)methyl] disulfide.

13. The process of claim 8 in which, in the composition, component (1) is an aminotriarylmethane containing at least two p-dialkylamino-substituted phenyl groups having, ortho to the methane carbon atom, a substituent selected from the group consisting of alkyl, alkoxy and halogen.

14. The process of claim 13 in which, in the composition, component (2) is an organic peroxide.

15. The process of claim 14 in which, in the composition, the oxidant component (b) of redox couple (3) is a quinone.

16. The process of claim 15 in which, in the composition, the reductant component (a) of redox couple (3) is an ether.

References Cited

UNITED STATES PATENTS

| | | | |
|---|---|---|---|
| 2,927,025 | 3/1960 | Ryskiewicz | 96—90 |
| 3,042,515 | 7/1962 | Wainer | 96—90 |
| 3,079,258 | 2/1963 | Agruss | 96—90 |
| 3,082,086 | 3/1963 | Sprague | 96—90 |
| 3,146,348 | 8/1964 | Workman | 96—49 |

FOREIGN PATENTS

| | | |
|---|---|---|
| 917,919 | 2/1963 | Great Britain. |

NORMAN G. TORCHIN, *Primary Examiner.*

C. E. DAVIS, *Assistant Examiner.*